Patented June 24, 1941

2,246,983

UNITED STATES PATENT OFFICE 2,246,983

COATING COMPOSITION AND METHOD OF MAKING THE SAME

Elmer B. Oberg, Evanston, Ill., assignor to United States Gypsum Company, Chicago, Ill., a corporation of Illinois No Drawing. Application October 14, 1937, Serial No. 168,937

6 Claims. (Cl. 134—46)

The present invention relates to a coating composition which may be employed, for example, as a paint. In its more particular aspects the invention relates to a water paint in paste form having such a composition and concentration that it may be diluted with, for example, one-half its volume of water so as to produce an improved and readily spreadable paint of the proper consistency.

One of the objects of the present invention is to produce a water paint in which there is employed, as a vehicle for the pigments, a solution of a protein which may be an animal casein, or vegetable protein. The last mentioned protein may be of the type which can be manufactured or extracted from soy beans, peanuts, or the like, there being also employed an alkaline or alkaline-reacting dispersing medium or solvent, as for example borax and other solvents as hereinafter specifically recited.

One of the primary objects of the present invention is to produce a water paint from a protein base, the viscosity of the final paint being accurately predetermined and controlled by a deliberately and carefully carried out and controlled partial or total hydrolysis or depolymerization of the protein molecule, preferably by subjecting it to the action of proteolytic enzymes.

A further object of the invention is to treat proteins, and particularly those of vegetable origin, with enzymes so as to produce proteins which, when dispersed by alkali-dispersing media, will have predetermined viscosity characteristics.

Other objects of the invention will become evident from the detailed description which follows.

Water paints such as have been used in industry and commerce for some years generally consist of an adhesive material plus the necessary pigments and fillers. The better and perhaps more permanent grade of vehicle generally used is based upon a protein binder such as animal casein or a vegetable protein such as that from soy beans, peanuts, and the like, in which case an alkali such as borax is generally depended upon to disperse or dissolve the protein.

In preparing an adhesive protein base or vehicle in the conventional manner it has become general practice to soak the protein in water for a period of from 20 to 30 minutes, whereupon a suitable dispersing medium or solvent such as borax, trisodium phosphate or disodium phosphate, or alkali is added so as to effect the dispersion or solution of the protein. It has also been suggested, in order to obtain a more readily soluble or dispersible protein, to act upon it, prior to the addition of the solvents, with peptizing or swelling agents, as for example sodium fluoride, this chemical being added to the water in which the protein is soaked. Chemicals of the type of sodium fluoride, acetamide, and the like have a decided tendency to swell the grains of the protein matter to many times their normal size without effecting a solution of the protein but, on the other hand, putting it into a condition where, because of the greater surface obtained by the swelling, the dispersing agents or solvents can assert their effect to better advantage. Solution of the protein after addition of the dispersing agents is usually effected by raising the temperature of the mixture, a very effective temperature range being one lying between 170° and 210° F. A protein solution thus prepared usually does not have the desired stability as to viscosity characteristics, and it has therefore already been proposed to add thereto certain materials which have come to be known as "stabilizers;" that is to say, reagents which will cause the resulting protein solution to have a uniform viscosity over long periods of time. Materials which effect such stabilization are the alkali salts of the amphoteric metals, and particularly such materials as sodium aluminate, sodium stannate, vanadate, and antimonate. A stabilized protein solution prepared in this manner is then employed as a base with which pigments and fillers are incorporated to produce the final paste, which is sold to the consumer and diluted by him to constitute a finished paint, ready for use.

While the production of protein paints in accordance with the prior art method immediately hereinabove recited leads to quite satisfactory results, it has been found, particularly when working with vegetable proteins such as those from soy beans and employing proper amounts of water, solvents and stabilizing agents, that the final product, when containing the correct and desirable amount of protein binding agent, may have too high a viscosity for proper working, in which case it becomes necessary to do one of two things: either to dilute the material, in which case there will be insufficient binder in the final product, or to modify the viscosity so as to produce a vehicle of a lower viscosity. This lowering of the viscosity can be attained by a depolymerization or partial degradation of the protein molecule, and it is this feature which constitutes the main point of novelty in connection with the present invention. Another reason for desiring to control the viscosity of the mixture or vehicle is that there is frequently a marked difference between the viscosity of solutions obtained from various sources of raw material, individual shipments of proteins quite frequently varying as to their viscosity characteristics, all of which interferes with the manufacture of a uniformly viscous and standardized protein paint vehicle. While the addition of stabilizers will stabilize the viscosity originally obtained, it has but little effect upon the viscosity itself, so that the stabilizer merely acts to maintain this viscosity for a relatively long time. However, if unstabilized, the protein solutions will after a short time considerably decrease in viscosity, this decrease in viscosity progressing, although at a slow rate, until eventually the viscosity is so slight that it is insufficient to maintain the pigments in suspension, as a result of which they settle at the bottom of the container in which the paint is stored, until it is very difficult by mere stirring to incorporate them with the vehicle to produce a sufficiently smooth and viscous mixture for painting purposes, or they may, in some cases, become heavier and set into a rubber-like gel which is very difficult to mix with water.

The present invention therefore contemplates the use of enzymes to attack the protein molecule so as to produce solutions which have a lower viscosity than would be the case had the enzymes been omitted.

The invention comprises the preparation of a protein solution or suspension of an initially greater than desired viscosity but of the desired protein concentration, followed by the adjustment thereof to an optimum hydrogen-ion environment, whereafter the solution or suspension thus prepared is subjected to the action of a suitable enzyme for a sufficient length of time and under the most favorable temperature conditions to effect a decrease in viscosity to the desired degree. As soon as this degree of viscosity is obtained, the solution is heated to the thermal death point or inactivation point of the enzyme, being maintained at this temperature a length of time sufficient to insure the destruction or deactivation of the enzyme, so that the viscosity will subsequently remain at the desired point. It is usually sufficient to heat the solution to a temperature of above 150° or 160° F., as most enzymes will be destroyed at such temperatures. At temperatures between 170° and 210° F. the destruction or deactivation of the enzymes will be assured, and for most purposes therefore it is within the contemplation of this invention to employ the latter range of temperatures.

The solution thus obtained is then employed as a base with which fillers, extenders, etc. can be incorporated in such a manner as to produce a composition of paste paint suitable for packing and sale.

For the purpose of the present invention a number of enzymes may be used, but by far the best results are obtained with those of a proteolytic type, particularly trypsin or pepsin.

It will be obvious to those familiar with enzymes that the hydrogen-ion concentration of the protein mixture that is treated is preferably adjusted to the optimum point where the enzymes are capable of exerting their best effects, this also being true of the temperature employed. In connection with trypsin and pepsin these conditions are fairly well known, and a pepsin solution will require a slightly acidic medium while trypsin, on the other hand, works equally well in a neutral or slightly alkaline environment.

As an illustration of one aspect of this invention and its application to the production of a protein solution of a desirable viscosity, a specific description will now be given in connection with the manufacture of a soy bean protein solution that is suitable as a base for water paint. It will at once be evident, however, to those skilled in the art that this process may be applied with similar effect to animal proteins such as milk casein and to other vegetable proteins, as for example those derived from peanuts, corn, etc.

*Example 1*

A mixture is prepared from 220 parts of soy bean protein and 800 parts of water, the protein being allowed to soak in the water for about 25 to 30 minutes. Thereafter there are added to this mixture about 2.2 parts of a pepsin preparation which has preferably been stirred with sufficient water so as to form a readily dispersible suspension. The protein, water and pepsin are stirred together until a uniform mixture is obtained, whereupon the mixture is heated to a temperature of from 95° to 100° F., at which temperature it is maintained for about 30 minutes or until sufficient reduction has taken place. What happens is a sort of digestion, depolymerization and/or degradation of the protein. It is not, however, allowed to go to completion, but only to such a point that the viscosity of the final solution obtained as hereinafter described will be assured. In using pepsin in the present example, it is desirable that the hydrogen-ion environment be slightly on the acid side, as for example at about a pH of 5.5. In the case of milk casein this is usually the normal pH of the material by reason of its method of manufacture, and most vegetable proteins as obtainable on the market have a slightly acid reaction. However, in case this should not be so, the acidity of the mixture is preferably adjusted by the addition of an extremely small amount of mineral acid, as for example hydrochloric acid, so that the suspension will have a pH of about 5.5.

Still referring to the present example, and going on from the point where the protein, water and pepsin mixture has been treated for 30 minutes at a temperature of from 95° to 100° F., there are then added thereto 13.8 parts of sodium stannate and 40 parts of borax, which two chemicals have previously been dissolved in about 200 parts of water, the solution of these chemicals being poured into the previously mentioned suspension of protein, water and pepsin, whereupon the mixture thus resulting is heated for about 15 minutes at a temperature between 160° and 180° F. until a solution of the protein has resulted. The temperature thus employed is sufficient to inactivate or kill the enzyme; that is, the pepsin in this case. The solution thus obtained is then suitable for use as a vehicle in a water paint composition, and it will not be necessary to describe the methods of incorporating the pigments, fillers, etc., as these methods are standard practice and fully familiar to those working in this art.

*Example 2*

As a further illustration of the invention, there will now be described a method of carrying it out, in which a proteolytic enzyme that will work in a slightly alkaline medium is employed. Thus a mixture may be made in accordance with the following formula:

| | |
|---|---|
| Vegetable protein | 104 lbs. |
| Borax | 18 lbs. 13 oz. |
| Sodium stannate | 6 lbs. 8 oz. |
| Trypsin (commercial) | 5.8 oz. |
| Water | 57 gal. |

The sodium stannate and the borax are dissolved in a small amount of water which may be heated if desirable to hasten the solution of these chemicals. The vegetable protein is allowed to soak in the rest of the water, except for perhaps a gallon or two of water that is reserved for the proper dispersion of the proteolytic enzyme—namely, the trypsin. After the vegetable protein has been allowed to soak for about 25 minutes in the main bulk of the water, the solution of the borax and sodium stannate is added thereto, whereafter a suspension of the enzyme in water is also added. The mixture is then heated, preferably by indirect steam, as for example in a jacketed kettle, to a temperature between 75° and 120° F., being maintained at the selected temperature for a period of about 30 minutes, the solution being constantly stirred during this time. During the heating period the enzyme will react with the protein and will hydrolyze its molecule to such an extent that the final viscosity of the solution obtained will be at the desired point. At the end of the 30 minutes at the mentioned temperature, the latter is rapidly raised to the thermal death point or inactivation temperature of the trypsin, as for example to 170° F., being maintained at this temperature for a period of, say, 40 minutes. This heating not only inactivates or kills the enzyme but also stabilizes the viscosity of the resulting solution so that it will maintain itself for a relatively long period of time.

It will thus be seen from the two examples hereinabove recited that a favorable environment should be created for the optimum activity of the enzyme, but these examples are not to be taken as limitations upon the present invention, because they are purely exemplicative and not limiting, and it will be obvious to those skilled in the art that by experimentation they can adapt the process to the various enzymes so as to secure the most favorable environment for them.

Irrespective of which of the two methods has been used to prepare the protein solutions, and as a further detailed disclosure of the method of carrying out the complete process of the present invention, there will now be described the method of making actual paint from the above solutions. For example, there may be taken the following:

| | Parts |
|---|---|
| Protein solution, including solvent | 1146 |
| Pigments and fillers | 1700 |
| Oils | 220 |

In the above formula the pigments and fillers may consist of lithopone, mica, talc, clay, or the like, these being slowly added to the protein solution with continuous agitation of the latter. The oils, which may be drying oils, wetting oils, hydrocarbon oils, etc., are then added, becoming emulsified in the mixture. A further dispersion of the pigments and homogenization of the mixture may be obtained in a conventional manner by grinding it, for example, in a paint mill or similar apparatus. The finally prepared product, which is preferably of such a consistency that it is like a paste, is then put into cans or other containers and put away for storage or shipment. It is generally intended that a product will be obtained which will stand dilution to the extent of 50% of its volume so as to eventuate a composition which has the proper viscosity and other characteristics to enable it to be spread on a wall or other surface by means of a brush or spray gun.

No example is given herein of the exact viscosities, as these so greatly depend upon the type of protein used that no exact standards can be given. However, those who are familiar with the manufacture of water paints will know how to adjust the viscosity to suit their particular requirements. Therefore, merely as a guide to what would be considered as a fair measure of viscosity-diminishing effect of the enzyme, it may be stated that the viscosity of, for example, a purified soy bean solution when made without the action of the enzyme and as determined on a Gardner Mobilometer is approximately 4210 seconds, using a 200-gram weight, while when treated with the enzyme, as hereinabove decribed, the viscosity based upon the same protein and amount of solvents, etc. is approximately 437 seconds, again using a 200-gram weight, both determinations being carried out at the same temperature, 25° C., with the fifty-one hole disc. It has been found that the best and preferred viscosity of the protein solution after treatment with the enzyme lies in the range of 300 to 600 seconds on the Gardner Mobilometer, using a 200-gram weight and carrying out the test at a temperature of 25° C. This viscosity has been found to be particularly useful in connection with the best type of water paints, because at that viscosity there is the maximum stability and the minimum settling out of pigments.

It is obvious that various adaptations of the present invention are possible and are to be construed as being within the scope of the present application.

What is claimed is:

1. The process of preparing a coating composition of predetermined lowered viscosity which comprises dissolving a protein in an alkaline solvent, adding a suitable proteolytic enzyme to the solution and permitting the same to hydrolyze the protein to reduce the viscosity thereof to a predetermined value, then heating the solution to deactivate the enzyme, and admixing pigments and fillers with the resulting solution.

2. The process of preparing a coating composition having predetermined reduced viscosity characteristics which comprises partially hydrolyzing a protein with a proteolytic enzyme to reduce its viscosity, regulating the degree of enzyme hydrolysis of the protein in accordance with the desired reduction in the viscosity characteristics of the resulting coating composition, dissolving the thus partially hydrolyzed protein in an alkaline solvent, deactivating the enzyme in the solution by heat whereby the reduced viscosity characteristics of the solution also become stabilized, and admixing the solution with pigments and fillers.

3. The process of preparing a coating composition having predetermined reduced viscosity characteristics which comprises swelling a protein, partially hydrolyzing said protein with a proteolytic enzyme to reduce its viscosity, regulating the degree of enzyme hydrolysis of the protein in accordance with the desired reduction in the viscosity characteristics of the resulting coating composition, dissolving the partially hydrolyzed protein in an aqueous alkaline solvent, deactivating the enzyme in the solution by heat whereby the reduced viscosity characteristics of the solution also become stabilized, and admixing the solution with pigments and fillers.

4. The process of preparing a coating composition having predetermined reduced viscosity characteristics which comprises dissolving a vegetable protein in a mildly alkaline solvent, reducing the viscosity of the resulting solution by partially hydrolyzing the dissolved protein by means of trypsin, regulating the degree of trypsin hydrolysis of the protein in accordance with the desired reduction in the viscosity characteristics of the resulting coating composition, heating the solution to above 150° F. to deactivate the trypsin, and then admixing pigments and fillers with the solution.

5. The process of preparing a coating composition of predetermined reduced viscosity which comprises dissolving soy bean protein in a borax solution, adding trypsin to the solution and maintaining it at about 90° F. to 95° F. for a time sufficient to reduce the viscosity of the solution by thus partially hydrolyzing the protein in the solution to such an extent that a solution having the desired lowered viscosity characteristics is produced, subsequently heating the solution to between 150° F. and 210° F. to inactivate the trypsin, and mixing pigments and fillers with the resulting solution.

6. The process of producing a protein coating composition which comprises decreasing the normal solution-viscosity of a protein by degradation of said protein by means of enzymatic action controlled as to extent of said action by time and temperature regulation, followed by heating of the protein and enzyme to a temperature within the range of about 150° F. to the boiling point so as to deactivate the enzyme and to preserve the acquired lowered viscosity characteristics of the protein.

ELMER B. OBERG.